Figure 1:
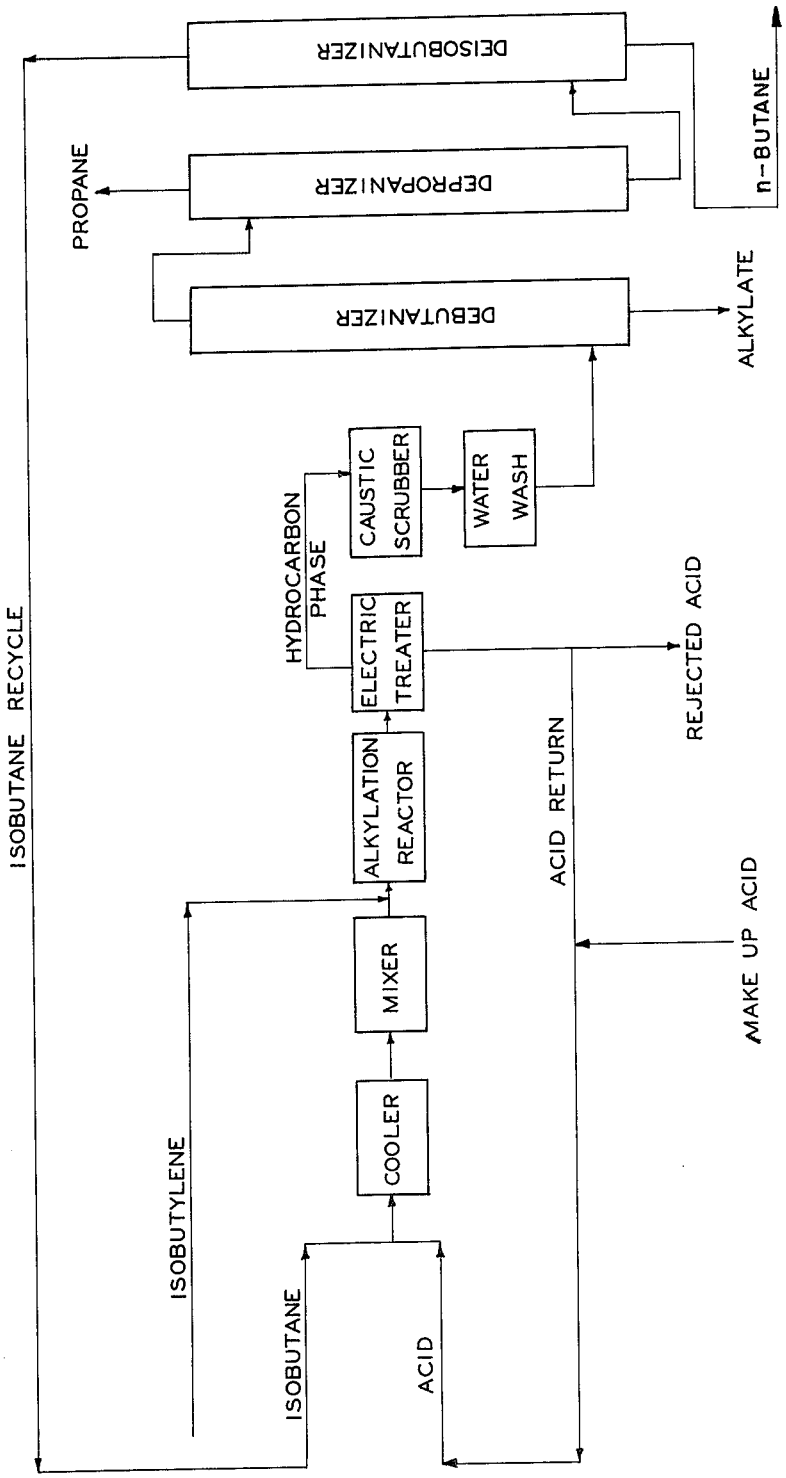

March 8, 1966     G. J. SAMUELSON     3,239,578
ALKYLATION PROCESS
Filed Feb. 21, 1962     2 Sheets-Sheet 1

March 8, 1966  G. J. SAMUELSON  3,239,578
ALKYLATION PROCESS
Filed Feb. 21, 1962  2 Sheets-Sheet 2

United States Patent Office 3,239,578
Patented Mar. 8, 1966

3,239,578
ALKYLATION PROCESS
Gilbert J. Samuelson, St. Louis, Mo., assignor to Petrolite Corporation, Wilmington, Del., a corporation of Delaware
Filed Feb. 21, 1962, Ser. No. 174,735
9 Claims. (Cl. 260—683.48)

This invention relates to a process of alkylation. This invention also relates to a process of alkylating hydrocarbons to produce an alkylate used as an important constituent of high octane gasoline.

Alkylation processes include the alkylation of paraffins, isoparaffins, aromatic compounds, cycloaliphatic compounds, etc., with olefinic hydrocarbons. The alkylation reaction may take place over a wide range of temperature ranging from below 0° F. when alkylating isoparaffins to as high as about 600° F. when certain aromatic compounds are reacted with olefins. It may be conveniently carried out under pressures at or below atmospheric or as high as several hundred atmospheres.

The major alkylation process in use today involves the reaction of isoparaffins with olefins in the presence of an acid catalyst to form valuable high octane gasoline components. The isoparaffins used may be isobutane, isopentane, isohexane, etc., or mixtures thereof. Olefins more often reacted are propylenes, butylenes, pentylenes, their isomers and mixtures thereof. In addition, one may utilize any proportions of the above as feed stocks as well as mixtures of isoparaffins and olefins with or without the presence of normal paraffins.

Various methods of preparing high octane alkylates by reacting olefins with paraffins, such as isoparaffins, are known. These methods include liquid phase catalytic alkylations with (1) hydrogen fluoride and (2) concentrated sulfuric acid. In general these methods are carried out by adding an olefin to an excess of an isoparaffin hydrocarbon emulsified in the catalyst. Excess isoparaffin is separated after alkylation and recirculated. Sufficient pressure is employed during the process to keep the reactants in the liquid phase. Higher temperatures can be employed with HF, such as 70–115° F., but lower temperatures for example 30–50° F. are employed with $H_2SO_4$ to suppress side reactions.

In a typical commercial alkylation, isobutane and the acid catalyst are introduced into an alkylation reaction zone, and are violently agitated to form an emulsion, this being the preferred method of assuring intimate contact between the acid catalyst and the hydrocarbon to be alkylated. Inasmuch as the reaction occurs at the liquid-liquid interface, it is necessary to provide violent agitation and intimate contact if the desired reaction is to take place. The major portion of the isobutane feed is provided by a recycle stream obtained from subsequent distillation steps; any additional quantity of isobutane required, for example that amount needed to start up the unit, is usually supplied from an independent source. The agitation may be provided in a number of ways. Usually a conventional mixer or pump provides a means for creating and moving the emulsion at high velocity and also for circulating the emulsion in the contact zone. The alkylation reaction may be carried out in one step, although more usually several steps in series are provided, with a portion of the olefin reactant being admitted to each stage and contacting isobutane passing serially through the successive stages. The alkylation feed which contains olefin reactant also contains isobutane, butylene, propane, propylene, and frequently small quantities of lighter paraffins. The temperature in the reaction zone is maintained at a constant low level by vaporizing therefrom the lighter components in the reaction products, more usually a mixture of butane, isobutane, propane, and any lower boiling compounds. Because of the high concentration of isobutane in the reactor liquid these vapors are predominantly isobutane. The vapors are compressed and condensed, and the condensate after the removal of propane and the lighter components is returned to the alkylation reaction zone in the isobutane recycle. The alkylation mixture leaving the last reaction stage, comprising a mixture of alkylate, acid and unreacted hydrocarbons, passes into a settling zone wherein contaminated acid catalyst, containing polymers and other impurities, is separated from the alkylate and unreacted isobutane. A portion of the contaminated acid is recycled to the contacting zone and the remainder is either purified for reuse, used in another process where a high degree of purity is not required, or is discarded. Alkylate and unreacted isobutane are further processed to separate the alkylate, and the isobutane is recycled to the contacting zone.

A disadvantage of such processing in the prior art is the requirement for massive volumes of catalyst; for example, the catalyst occupies 35–60% of the volume of the reactor. Since the catalyst in the case of sulfuric acid is not as effective when it becomes diluted to 90%, the industry is faced with a huge sulfuric acid disposal or regeneration problem which is both expensive and burdensome. Such massive volumes of catalyst require larger reaction vessels that would be employed if smaller amounts of catalyst could be employed. In addition, massive volumes of sulfuric acid tend to promote side reactions. Often the emulsions formed are hard to break upon completion of the reaction so that reaction contact time cannot be fully controlled.

I have now discovered a method of alkylation which avoids the problems associated with the use of massive volumes of alkylation catalyst and the absence of emulsion breaking control which comprises reacting an olefin with an isoparaffin in the presence of a dispersed catalyst wherein the hydrocarbon phase is the continuous phase of said dispersion; and then subjecting the resulting product to an electric field. The present process uses substantially less acid by "making a little acid go a long way" since the acid now functions as a low volume rather than as a massive volume catalyst. This is effected by finely dispersing catalytic amounts of acid in the reaction medium, preferably in the isoparaffin so that the effective catalytic surface area of the acid, which effects reaction between the isoparaffin and the olefin, is maximized. However, the more dispersed the acid the more difficult is the final separation of the acid from the reaction mixture since finely divided particles do not readily settle on standing. By employing an electric field in conjunction with these fine dispersions of acid, the reaction time is more readily controlled since the application of an electric field, by effecting removal of the catalyst, stops the reaction and thus minimizes undesirable side reactions. In addition, rapid removal of the catalyst by the electric field decreases the time required to allow the catalyst to settle, permitting faster throughput. Thus, the present process permits the advantages of a finely dispersed catalyst without the disadvantages associated therewith since an electric field solves demulsification problems generally inherent in a system containing finely dispersed particles.

Thus, this process (1) requires lesser volumes of sulfuric acid, (2) requires a smaller reactor, (3) results in fewer side reactions during alkylation, (4) reduces the disposal problem associated with larger volumes of spent sulfuric acid since lesser amounts of catalyst yield greater amounts of alkylate as compared to prior processes, etc. and (5) facilitates demulsification upon completion of the reaction.

In its broadest aspects, the present invention relates to an alkylation process characterized by (1) a dispersion or emulsion of alkylation catalyst in the hydrocarbon phase so that a hydrocarbon continuous phase is maintained in the system and (2) the treatment of said hydrocarbon continuous system with an electric field upon completion of alkylation.

The invention may be described by referring to the following figures which present flow diagrams of the alkylation process as practiced by this invention. These are presented for purposes of illustration and not of limitation.

*Example 1*

In FIGURE 1, isobutane and 98% sulfuric acid are pumped into the cooler in metered proportions and then to the mixer where the acid is finely dispersed in isobutane. In the cooler the reaction mixture is cooled to 0 to 75° F., for example 25 to 50° F., but preferably 30 to 45° F. In practice temperatures of 30–35° are generally employed.

Dispersion of the catalyst in isoparaffin can be achieved by any suitable means such as for example circulating pumps, jet injectors, agitating and circulating devices, etc., as well as more drastic dispersing means such as ultrasonics, colloidal mills, etc.

The agitation should be sufficient to produce a finely divided emulsion or dispersion which will be stable until it is desired to separate the hydrocarbon and catalyst phases at the conclusion of the reaction. Increased agitation generally improves the results secured, and the ultimate limit in this regard will be determined by economic considerations, in view of the power consumption required to improve agitation sufficiently to effect an improvement in yield or quality of the alkylate and the difficulties which may be encountered in separating a very finely divided and relatively stable emulsion. Since the electrostatic field can break a "tight emulsion," very fine dispersions can be prepared.

Isobutylene is then added to the cooled dispersion and the reaction mixture is pumped to the alkylation reactor. The molar ratio of isobutane to isobutylene is in large excess, for example a ratio of about 15 to a ratio of about 3, for example, 5 to 10, but preferably about 6 to 9.

Since a little acid goes a long way, and the fine dispersions increase the surface area of the acid, relatively little acid as compared to the prior art is employed, for example from about 3 to 50 volumes or more of acid per 100 volumes of hydrocarbon, advantageously 5 to 30 volumes, but preferably 10 to 20 volumes. However, regardless of volume ratios employed, the emulsion or dispersion formed should be hydrocarbon continuous.

Isobutylene is introduced into the cooled hydrocarbon-continuous acid dispersion leaving the mixer, and the resulting alkylation mixture is pumped into the alkylation reactor.

The alkylation reaction is initiated upon introduction of the isobutylene and continues in the reactor. It is desirable to provide sufficient agitation of the alkylation mixture in the reactor to maintain the acid catalyst in a fine state of subdivision most favorable, because of the large catalyst-isobutane surface area, to the alkylation reaction. Such agitation can be provided by conventional mixing devices which employ internal or external recirculation.

The residence time in the alkylation reactor is sufficient to accomplish substantially complete conversion of the isobutylene to alkylate, generally not exceeding about 20–30 minutes and preferably not exceeding about 5–10 minutes, and most preferably not exceeding five minutes.

From the alkylation reactor the alkylation mixture, which now comprises alkylated product, unreacted hydrocarbons, and acid materials, all in intimate admixture, is now passed into the electric treater where it is subjected to an electric field of sufficient voltage to separate rapidly the acid catalyst therefrom. Voltages capable of effecting this will vary depending on many variables. Voltage gradients employed are in the range of about 1–50 kv., based on 1 inch electrode spacing, such as about 5–25 kv./in., for example about 8–20 kv./in. but preferably about 10–15 kv./in. Both alternating and direct currents can be employed, but preferably direct current. A wide variety of electric treaters can be employed, for example those disclosed in U.S. Patents 2,897,251, 2,976,228 and elsewhere.

By means of the electric field, the acid and hydrocarbons are separated into two phases, hydrocarbon (upper) and acid (lower). The bulk of the acid is returned to mixer while a portion of the acid is withdrawn from the system.

After leaving the electric treater, the mixture of alkylate and unreacted hydrocarbons (upper phase) enters the caustic scrubber where the small amounts of acid remaining in the hydrocarbons are neutralized with aqueous alkali. From the caustic scrubber the hydrocarbons after being water washed enter the debutanizer wherein the unreacted hydrocarbons are separated from the alkylated products by distillation. The lighter unreacted hydrocarbons pass to the depropanizer wherein the $C_4$ or butane hydrocarbons are separated by distillation from propane and lighter hydrocarbons. The butane fraction is then transferred to the deisobutanizer wherein n-butane is separated from isobutane. Isobutane is recycled to the start of the system.

If desired an electric field can be employed to separate aqueous caustic or water from the hydrocarbons prior to entering the debutanizer.

In the above example, specific data is as follows:

| | |
|---|---|
| Reaction temperature ° F | 30–35 |
| Reaction time minutes | 5 |
| Volume of acid/100 vol. hydrocarbon | 10 |
| Electric field kv./in. | 14 |
| Isobutane/olefin molar ratios | 8 |

*Example 2*

Figure 2:
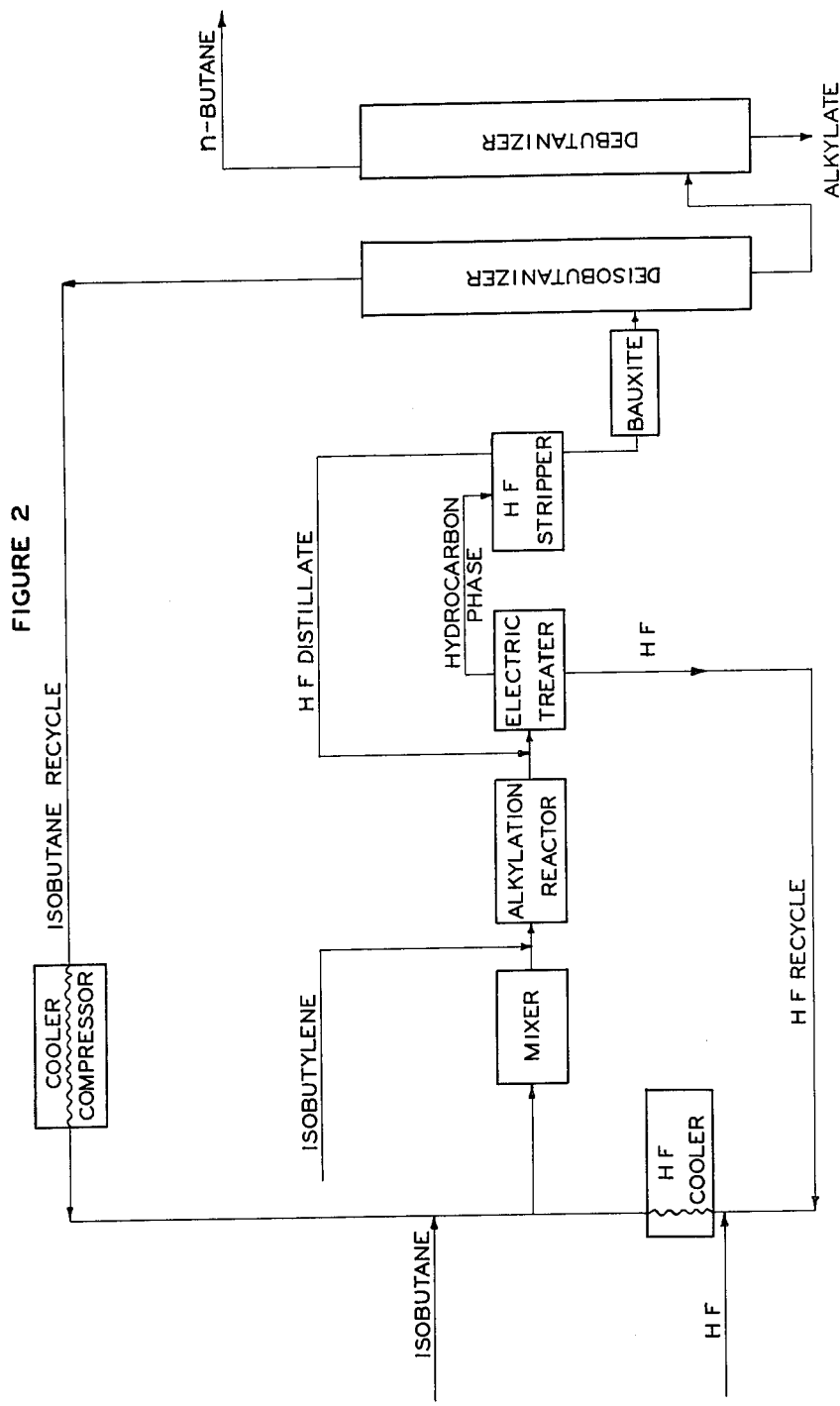

FIGURE 2 illustrates the invention employing hydrofluoric acid (HF). Both isobutane and cooled HF are fed to the mixer at a metered rate where the HF is finely dispersed in isobutane. Isobutene is added to this dispersion which is pumped to the alkylation reactor. After alkylation the reaction mixture is passed to an electric treater which separates the hydrocarbon phase (upper) from the acid phase (lower). The HF phase is recycled. The hydrocarbon phase is taken overhead from the electric treater and sent to the HF stripper where a major portion of dissolved and suspended HF carried over in the hydrocarbon phase is vaporized and returned to the electric treater. The bottoms from the HF stripper are passed to the deisobutanizer for removal of isobutane for recycling. Residual traces of HF and organic fluoride contained in the bottom from the HF stripper may be removed by chemical treatment, as with bauxite, prior to introduction of the hydrocarbons in the deisobutanizer. The isobutane is removed as overhead and condensed and returned to the mixer for recycling in the alkylation reactor. The bottoms from the deisobutanized are passed to the debutanizer where n-butane formed during the reaction or contained in the feed hydrocarbons is removed overhead. If desired, n-butane may be isomerized to isobutane and recycled into the alkylation. The bottoms contain the alkylate.

In the above example, specific data are as follows:

| | |
|---|---|
| Reaction temperature p.s.i. | 75–80° F./140–150 |
| Reaction time minutes | 5 |
| Volume acid/100 vol. hydrocarbon | 5 |
| Electric field kv./in. | 15 |
| Isobutane/olefin molar ratios | 8 |

Many variations in the above processes will be evident to one skilled in the art. For example, the isobutane and isobutylene can be premixed prior to dispersion of the catalyst therein.

The present invention is particularly applicable to the alkylation of isobutane with $C_3$, $C_4$, or $C_5$ olefins, or mixtures thereof, for the production of gasoline of high octane and quality. However, it is to be understood that the invention is applicable to the alkylation of any isoparaffin with any olefin. Thus, the isoparaffin may be isobutane, isopentane or isohexane. The olefin may be propylene, butylenes, pentylenes, hexylenes, other higher boiling monomeric olefins or certain selected fractions of cracked naphthas, olefin polymers such as di-isobutylene, tri-isobutylene, co-polymers of isobutylene and normal butylene such as the codimer, and various mixed polymers.

While the present invention has been described above as applying particularly to the use of sulfuric acid and HF as catalysts, it is to be understood that any other suitable and conventional alkylation catalyst can be employed, such as phosphoric acid, aluminum chloride-hydrocarbon complex, $BF_3 \cdot H_2O$, chlorosulfonic acid, fluorosulfonic acid and the like. The operating conditions for these catalysts are well-known, and conventional conditions coupled with the features of the present invention as set forth above may be used.

Moreover, the present invention is applicable to the alkylation of any organic compound having a readily replaceable hydrogen atom with any suitable alkylating agent. As stated above, the invention is of particular importance in the alkylation of an isoparaffin or other paraffin hydrocarbon having a tertiary carbon atom in the molecule, to enable a superior quality to be produced in large capacity. But the principles of the present invention are applicable to the alkylation of a normal paraffin, a naphthene or cycloparaffin, and an aromatic hydrocarbon. as well as or instead of the isoparaffin. In place of an olefin as the alkylating agent, various alkyl esters, such as the sulfates, chlorides, fluorides, etc., may be used. For example, the present invention can be employed in a two-stage absorption-alkylation process, wherein the olefin is absorbed in acid in the first stage to produce the corresponding alkyl ester, and the ester either in solution in the absorbing acid or after separation therefrom as by isobutane or alkylate extraction, is then alkylated in the second stage in accordance with the present invention. Moreover, various aliphatic alcohols and ethers which are capable of forming olefins on reaction, such as tertiary butyl alcohol, isopropyl alcohol, butyl ether, etc., may be employed as the alkylating agent, particularly with catalysts which have tolerance for water liberated in the reaction.

The term "alkylatable compound" relates to any organic compound having a replaceable hydrogen atom which can be alkylated with an olefin or other suitable alkylating agent. The term "alkylating agent" relates to a material such as an olefin or its equivalent which is capable of alkylating said alkylatable compound. The term "alkylation catalyst" refers to an agent capable of effecting reaction between the alkylating agent and the alkylatable compound. The term "alkylation mixture" refers to the reaction product following alkylation. The reaction may be summarized as follows:

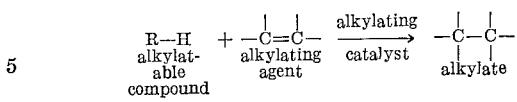

It is not intended that this invention be limited to the specific embodiments presented and described herein as many modifications thereof are possible without departing from the scope and spirit of the invention. The principle of this invention wherein an electric field is applied to an oil continuous dispersion of an alkylation catalyst in the alkylation mixture is applicable generally to the broad scope of the alkylation reaction.

Having thus described my invention, what I claim as new and desire to obtain by Letters Patent is:

1. A process of alkylation which is characterized by forming an oil continuous dispersion of an alkylation catalyst in an alkylation mixture and subjecting said oil continuous dispersion of an alkylation catalyst in the alkylation mixture to an electric field, said electric field simultaneously causing rapid removal of said catalyst and stoppage of said alkylation process, said alkylation process continuing until said simultaneous rapid removal and stoppage by said electric field, said process minimizing undesirable side reactions and permitting faster throughput.

2. The process of claim 1 where the alkylation catalyst is sulfuric acid.

3. The process of claim 1 where the alkylation catalyst is hydrofluoric acid.

4. The process of claim 1 wheerin the alkylation mixture contains an isoparaffin as the alkylatable compound and an isoolefin as the alkylating agent.

5. The process of claim 4 wherein the alkylation catalyst is sulfuric acid.

6. The process of claim 4 wherein the alkylation catalyst is hydrofluoric acid.

7. The process of claim 4 wherein the isoparaffin is isobutane and the isoolefin is isobutylene.

8. The process of claim 7 wherein the alkylation catalyst is sulfuric acid.

9. The process of claim 7 wherein the alkylation catalyst is hydrofluoric acid.

References Cited by the Examiner

UNITED STATES PATENTS

| | | | |
|---|---|---|---|
| 2,245,038 | 6/1941 | Holm et al. | 260—683.46 |
| 2,322,482 | 6/1943 | Stahly et al. | 260—683.62 |
| 2,395,011 | 2/1946 | Perkins | 204—190 |
| 2,447,530 | 8/1948 | Perkins | 204—190 |
| 2,618,669 | 11/1952 | Mrstik | 260—683.46 |
| 2,855,357 | 10/1958 | Stenzel | 204—190 |

ALLEN B. CURTIS, *Primary Examiner.*

JOHN R. SPECK, JOHN H. MACK, *Examiners.*

R. GOOCH, B. J. OHLENDORF, *Assistant Examiners.*